United States Patent
Schneider

(10) Patent No.: US 11,920,648 B2
(45) Date of Patent: Mar. 5, 2024

(54) SLIP CLUTCH DEVICE FOR AN ELECTRIC DRIVING MACHINE

(71) Applicant: Schaeffler Technologies AG & Co. KG, Herzogenaurach (DE)

(72) Inventor: Michael Schneider, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 344 days.

(21) Appl. No.: 17/262,455

(22) PCT Filed: Sep. 3, 2019

(86) PCT No.: PCT/DE2019/100793
§ 371 (c)(1),
(2) Date: Jan. 22, 2021

(87) PCT Pub. No.: WO2020/057691
PCT Pub. Date: Mar. 26, 2020

(65) Prior Publication Data
US 2021/0231177 A1    Jul. 29, 2021

(30) Foreign Application Priority Data

Sep. 20, 2018  (DE) .......................... 102018123137.7

(51) Int. Cl.
*F16D 7/02* (2006.01)
*F16F 15/129* (2006.01)
*F16D 43/21* (2006.01)

(52) U.S. Cl.
CPC .......... *F16D 7/025* (2013.01); *F16F 15/1297* (2013.01); *F16D 43/215* (2013.01); *F16D 2300/22* (2013.01); *Y10S 464/90* (2013.01)

(58) Field of Classification Search
CPC .... F16D 7/025; F16D 43/215; F16D 2300/22; F16F 15/1297; Y10S 464/90
(Continued)

(56) References Cited

U.S. PATENT DOCUMENTS

| 3,625,292 A | * | 12/1971 | Lay | A01G 3/062 |
| | | | | 464/46 |
| 10,344,816 B2 | * | 7/2019 | Karimi-Moghaddam | |
| | | | | F16D 69/02 |
| 2012/0115620 A1 | | 5/2012 | Iwama et al. | |

FOREIGN PATENT DOCUMENTS

| CN | 2497099 Y | 6/2002 |
| CN | 101900181 A | 12/2010 |

(Continued)

OTHER PUBLICATIONS

Deep-L Machine Translation of unpublished German Application DE102018115083A1, filed Jun. 22, 2018, by Schaeffler Technologies AG & Co. KG.

(Continued)

*Primary Examiner* — Greg Binda

(57) ABSTRACT

A slip clutch device for an electric driving machine includes a rotation axis, an input side rotatable about the rotation axis, an output side rotatable about the rotation axis, and a slip clutch connecting the input side to the output side in a torque-limiting manner. The slip clutch includes an electrical insulation element for preventing an electrical disruptive discharge line between the input side and the output side, a friction disc, and a friction plate, pressed against the friction disc in a contact region in a frictionally engaged torque-transmitting manner. The friction disc or the friction plate is formed from an electrically insulating material in an insulation region extending radially over the contact region, and the insulation region is a bearing structure for radially transmitting torque.

9 Claims, 2 Drawing Sheets

(58) Field of Classification Search
USPC .................................................. 464/464, 46
See application file for complete search history.

(56) References Cited

FOREIGN PATENT DOCUMENTS

| | | | |
|---|---|---|---|
| CN | 102454720 | A | 5/2012 |
| CN | 105465209 | A | 4/2016 |
| CN | 106594106 | A | 4/2017 |
| DE | 69931434 | T2 | 4/2007 |
| DE | 102007053517 | A1 | 5/2009 |
| EP | 3001062 | A1 | 3/2016 |
| JP | H10311399 | A | 11/1998 |
| JP | 2012102755 | A | 5/2012 |
| WO | 2019/242808 | A1 | 12/2019 |

OTHER PUBLICATIONS

Unpublished German Patent Application No. DE 10 2018 115 083.0 filed Jun. 22, 2018 and received at the International Bureau of WIPO on Jun. 27, 2019 as a priority document for International Application No. PCT/DE2019/100523. The document was published on Dec. 26, 2019 when the International Application was published by WIPO as WO/2019/242808 on the same date.

\* cited by examiner

SLIP CLUTCH DEVICE FOR AN ELECTRIC DRIVING MACHINE

CROSS-REFERENCE TO RELATED APPLICATIONS

This application is the United States National Phase of PCT Appln. No. PCT/DE2019/100793 filed Sep. 3, 2019, which claims priority to German Application No. DE102018123137.7 filed Sep. 20, 2018, the entire disclosures of which are incorporated by reference herein.

TECHNICAL FIELD

The disclosure relates to a slip clutch device for an electric driving machine, a drive train with such a slip clutch device, and a motor vehicle with such a drive train.

BACKGROUND

Modern electric motors for driving vehicles are controlled by frequency converters. High clock frequencies in the range of 20 kHz [twenty kilohertz] and higher are used to obtain almost sinusoidal current curves on the motor. Due to the high clock frequency and short switching times, the capacitances in the motor between the housing and the rotor, the housing and the winding, as well as the winding and the rotor, can no longer be neglected. This capacitive coupling generates voltages between the motor housing and the rotor or the shaft.

When using bearings with metallic rolling bodies, this tension occurs at the bearing lubrication gap. If the bearing voltage exceeds the disruptive discharge voltage of the lubricating film, an electrical disruptive discharge occurs. This leads to spark erosion and can cause damage to the bearings and even failure.

In modern motor vehicle electric drives, for example in e-axles, the electric motor is flanged directly to a transmission or even integrated into the transmission housing. Therefore, there is an electrical connection from the motor housing to the transmission housing. Since the shaft of the electric motor is directly connected to the input shaft of the transmission, there is also an electrical connection here so that the parasitic currents also go through the transmission and the bearings located there as well as the rolling contacts in the toothing of the individual gear wheels. There, these currents also lead to spark erosion in the bearings and the toothing of the gear wheels.

In contrast to vehicles powered by conventional internal combustion engines, electric vehicles do not require a friction clutch as a starting element for pure driving operation. In addition to the function of transmitting the driving torque from the driving machine to the transmission, this friction clutch also has the advantage that shock torques introduced into the drive train by the wheels are limited because the clutch slips in the event of an overload. Slip clutches are also often used in hybrid vehicles to protect the drive train. However, shock torques or overload torques that are introduced into the drive train by the wheels are also present in electric vehicles. The entire drive train must therefore be designed for these high loads, which can exceed the drive torque by a factor of 3 to 4, or these loads must be limited to protect the drive train.

Unpublished German Patent Application No. DE 10 2018 115 083 A1, published as a priority document in the file of PCT Publication No. WO/2019/242808 on Dec. 26, 2019, discloses an electrically insulating slip clutch for a motor vehicle drive train and a motor vehicle drive train. Here it is proposed, among other things, to use a multi-plate clutch with an inner plate carrier and an outer plate carrier as the slip clutch, and an insulating disc is arranged between the externally toothed output plate carrier and the output hub, i.e., the shaft connection to the transmission input shaft, the slip clutch. Such a slip clutch is shown in FIG. 1. Although many standard elements can be used here and tight installation space requirements can be adhered to, the construction is complex and therefore cost-intensive.

SUMMARY

The disclosure relates to a slip clutch device for an electric driving machine, having at least the following components:
an input side;
an output side, the input side and the output side being rotatable about a common rotation axis; and
a slip clutch, which connects the input side and the output side to each other in a torque-limiting manner. The slip clutch includes a friction disc and an antagonistic friction plate, which are pressed against each other in a contact region in a frictionally engaged torque-transmitting manner to form an electrical insulation element, by which an electrical disruptive discharge line between the input side and the output side is prevented.

The friction disc and/or the friction plate are formed from an electrically insulating material, at least in an insulation region extending radially over the contact region. The insulation region is designed as a bearing structure for transmitting torque in the radial direction.

In the following, if the axial direction, radial direction or the circumferential direction and corresponding terms are used without explicitly indicating otherwise, reference is made to the mentioned rotation axis.

It should be pointed out that the slip clutch device proposed here fits into a narrow installation space between an electric motor and the transmission housing, for example in a motor vehicle as an insulation element with an overload protection function. In the radial direction, this installation space usually corresponds approximately to the diameter of the rotor and is, for example, less than 200 mm [two hundred millimeters]. In the axial direction, for example, when the motor is screwed directly to the transmission, a maximum of 15 mm [fifteen millimeters] to 30 mm is available between the motor bearing and the seal or the transmission input bearing. Instead of a conventional continuous connecting shaft, the slip clutch device is intended to connect the electric driving machine and the transmission. The conventional continuous connecting shaft is divided into two partial shafts, for example the drive shaft of the electric driving machine and the transmission input shaft of the transmission, which are connected to one another. The slip clutch device can be used, for example, as described in DE 10 2018 115 083 A1, which was published afterwards.

A suitable electric driving machine is arranged to be axially parallel, coaxial (with a drive shaft as a hollow shaft) or transverse to an output shaft and connected thereto in a torque-transmitting manner via a transmission. The transmission is a step-up transmission, for example a simple gear stage or a transmission or a continuously variable belt transmission, and/or a differential for the needs-based distribution of the applied torque. The electric driving machine can be used, for example, on the rear axle or front axle of a motor vehicle, namely as a single driving machine (electric vehicle), as an additional driving machine in addition to a further driving machine, for example an internal combustion engine, or as a starter generator to support and/or start an internal combustion engine and for conversion of mechanical energy into electrical energy, for example by recuperation of braking energy.

The slip clutch device includes an input side, via which a torque can be input, and conversely, a torque can also be received in the direction of the electric driving machine, for example. This input side can be connected to the electric driving machine. If the input side is part of a separate assembly or a separate (coherently pre-assembled) assembly of the slip clutch, it is designed as an input shaft hub. The input shaft hub can be connected in a form-fitting manner, for example by splines or bolt rivets, and/or in a force-fitting manner, for example by a screw connection, directly or indirectly to the drive shaft of the electric driving machine in a torque-transmitting, e.g., torsionally-rigid, manner. In an alternative embodiment, the input side is a component of the slip clutch itself, for example the friction disc itself.

The slip clutch device also includes an output side, via which a torque can be output, and conversely, a torque can also be received in the direction of the electric driving machine, for example. This output side can be connected to the transmission shaft. If the output side is part of a separate assembly or a separate (coherently pre-assembled) assembly of the slip clutch, it is designed as an output shaft hub. The output shaft hub can be connected in a form-fitting manner, for example by splines or bolt rivets, and/or in a force-fitting manner, for example by a screw connection, directly or indirectly to the transmission shaft of the transmission in a torque-transmitting, e.g., torsionally-rigid, manner. In an alternative embodiment, the output side is a component of the slip clutch itself, for example the friction plate itself.

The input side, for example the input shaft hub, and the output side, for example the output shaft hub, can be rotated about a common rotation axis. An axial offset of less than 1 mm [one millimeter], e.g., up to 0.7 mm [seven hundred micrometers], is within the tolerance range.

The slip clutch connects the input side and the output side to each other in a torque-transmitting manner. The maximum transferable torque is limited to a maximum setpoint, for example 10% [ten percent] to 25% above the (required) maximum torque that can be generated by the electric driving machine. This means that the connection between the input side and the output side is torque-limited. This limited torque transmission is created, for example, in the manner of a brake with a brake disc and brake block, by a friction disc on the input side, i.e., connected to the input side in a torque-transmitting, e.g., torsionally-rigid, manner, and an antagonistic, output-side friction plate, i.e., connected to the output side in a torque-transmitting, e.g., torsionally-rigid, manner.

The friction disc and/or the friction plate are axially movable, e.g., displaceable, such that an (axial) pressing force leads a contact region of the friction disc and the friction plate against one another in such a way that a frictional connection is formed by the contact region. The friction disc and the friction plate are thus pressed against one another in a frictionally engaged, torque-transmitting manner when a pressing force is applied. This pressing force can be applied in a defined manner from the outside by pre-tensioning, at least during use. For example, the pressing force is generated by a compression spring installed in the insert in a tensioned manner. If the applied torque is greater than the maximum setpoint value during operation, the axially movable friction partner, i.e., the friction disc and/or the friction plate, lifts off against the applied pressing force with an axial stroke, such that the transmittable torque decreases. The electric driving machine is thus protected from an overload torque above the maximum setpoint value from the output side and the transmission is protected against a shock torque above the maximum setpoint value from the electric machine.

The electrical insulation element prevents an electrical disruptive discharge line between the input side and the output. For this purpose, the insulation element is configured in such a way that its own impedance and the distance between (better) conductive adjacent components of the slip clutch are so large that an expected voltage potential does not lead to an electrical disruptive discharge. When used in an electrified drive of a motor vehicle, the voltage potentials to be expected are, for example, 2 kV [two thousand volts] to 8 kV, e.g., 3 kV to 6 kV. It follows from this that an air gap or distance in the air environment of approximately 1 mm [one millimeter] to 4 mm, for example 2 mm to 3 mm, is required.

It is proposed here that the friction disc and/or the friction plate of the slip clutch include an insulation region made of an electrically insulating material, for example ceramic or an electrically non-conductive (for example fiber-reinforced) plastic. In order to meet the above-mentioned condition, the insulation region is formed with an extension so far beyond the contact region that an electrical disruptive discharge through the insulation material and through the air is reliably prevented. At the same time, the insulation region forms the contact region or a bearing structure for a friction lining, and the friction lining is (only) an electrical non-conductor, for example. The insulation region is configured as a bearing structure for transmitting a torque in the radial direction. The insulation region is thus configured for a sufficiently high torque transmission that is sufficiently rigid in terms of vibrations and (low) dissipative losses.

A conventional rubber connection, which causes high dissipative losses in a drive train subject to vibrations and changing torque directions, used as an insulation region is therefore excluded because the slip clutch must be configured for changing torques, as required in mobile units such as a motor vehicle, for example. In this context, it should be pointed out that the presence of an overload torque or shock torque and thus slipping of the slip clutch is a rare operating state, and for the other operating states, the aim is to transmit torque with as little loss as possible. This can be achieved with the present slip clutch device and the rigid insulation region.

The insulating disc disclosed in DE 10 2018 115 083 A1, which was published afterwards, transmits a torque only in the circumferential direction or via (axial) shear. The large number of friction linings in the plate set are often formed from an electrically insulating material, but are also designed solely to transmit a torque in the circumferential direction or via (axial) shear. In addition, the air gap or distance between two adjacent plates, which are formed from electrically conductive material, for example steel, is too small to prevent electrical disruptive discharge. In addition, the friction linings form, i.e., define, the contact region and therefore do not form an insulation region that extends beyond the contact region. A conventional plate set, as disclosed in the cited document, which was published afterwards, is therefore not designed with insulation properties (which are sufficient against electrical disruptive discharge).

The slip clutch device proposed here provides the possibility of a simple, i.e., inexpensive, construction that requires little installation space. In addition, a long service life can be achieved and a disruptive discharge can be prevented overall, i.e., no disruptive discharge in the case of intermediate components. This also eliminates the need for (relative) grounding, for example by a sliding contact, intermediate components or a correspondingly robust design of such intermediate elements against spark erosion.

According to an example embodiment of the slip clutch device, the slip clutch for transmitting a torque includes only the friction disc and the friction plate.

As an alternative to the embodiment proposed here, a plurality of friction discs and/or friction plates may be provided for transmitting a torque, and each of the friction discs and/or friction plates is configured as described above to prevent an electrical disruptive discharge. With this embodiment, a multiple (roughly corresponding to the number of friction pairings) of a torque can be transmitted with (roughly) the same pressing force via this friction set with a plurality of friction pairings in a small radial installation space.

According to one embodiment, the slip clutch for transmitting a torque includes only the friction disc and the friction plate as described above, i.e., only a single friction disc and only a single friction plate, which form a single (common) friction pairing over the contact region. The construction is simple and requires little axial installation space. With a suitable (thick) design of the friction disc and the friction plate, a high pressing force can be applied, with which a high torque can be transmitted in a frictionally engaged manner. Because this is a passive slip clutch, the pressing force can be designed to be higher than that of a friction clutch for active opening and closing, for example to change a gear ratio by a clutch.

According to an example embodiment of the slip clutch device, the friction disc and/or the friction plate are formed entirely from an electrically insulating material.

In this embodiment, the manufacture of the friction disc or the friction plate from the electrically insulating material is simple, for example in the case of a plastic by (for example 1K) injection molding or in the case of a ceramic by sintering. In addition, the risk of arcing from one conductive component to another of the slip clutch or slip clutch device is intrinsically excluded due to the mechanical requirements and the resulting component thickness or (radial) expansion.

According to an example embodiment of the slip clutch device, an axially acting disc spring is provided for pressing the friction disc and the friction plate.

A disc spring requires little axial space for a high axial force that can be generated or maintained. In addition, given a suitable preload, the gradient of the spring characteristic curve is small and this results in only a slight increase in force during the axial stroke of the friction disc or friction plate to be pressed. This means that the pressed components for normal operation, i.e., the frictionally engaged torque transmission, can be designed close to their respective load limit. For example, in the case of an axial stroke with an applied overload torque, the deflection of a friction surface (due to a not very steep increase in force) does not increase excessively, preventing a sufficient decrease in torque and/or abrasive grinding with line contact between the friction disc and the friction plate due to excessive bending.

According to an example embodiment of the slip clutch device, the friction disc is formed in one piece with the input side formed as an input shaft hub and/or the friction plate is formed in one piece with the output side formed as an output shaft hub.

In this embodiment, the number of components of the slip clutch device compared to the embodiment according to DE 10 2018 115 083 A1, which was published afterwards, is reduced. Overall, the construction is simplified and cheaper. In the case of a one-piece design of the friction disc with the input shaft hub and/or the friction plate with the output shaft hub, a friction lining may be formed separately, for example. The radial extension of the friction disc up to the input shaft hub and/or the friction plate up to the output shaft hub is, however, designed in one piece, i.e., the radial transmission of the torque is accomplished by the one-piece friction disc and/or the one-piece friction plate up to the respective shaft hub. The input shaft hub and/or the output shaft hub may include a form-fitting connection, e.g., an (outer-side or inner-side) spline.

According to an example embodiment of the slip clutch device, the friction disc or the friction plate is connected to the input side or to the output side so as to be axially movable by a form-fitting connection in a torsionally-rigid manner.

In this embodiment, the friction disc is axially fixed and the friction plate is axially movable, for example displaceable, or the friction plate is axially fixed and the friction disc is axially movable, for example displaceable. The axially movable friction partner, i.e., the friction disc or the friction plate, is only connected to the respective side in a torsionally-rigid, form-fitting manner.

In one embodiment, a damper or absorber or another element is interposed between the (axially movable) friction partner and a respective hub, i.e., an input shaft hub or an output shaft hub. In that case, the friction partner in question is only connected in a torsionally-rigid manner in the direct connection to the respective hub. The relevant friction partner is only indirectly connected to the relevant hub in a torque-transmitting manner. In this case, the side in question is not identical to the hub, even if the slip clutch device forms a pre-assembled assembly.

In one embodiment, the form-fitting connection is a spline. In one embodiment, the spline is designed to be inserted into a complementary spline of an input shaft hub or output shaft hub, and the complementary spline of the hub in question is configured to connect to a drive shaft or a transmission input shaft.

According to one embodiment, regarding the above description for pressing the friction disc and the friction plate, the disc spring is axially supported on the input side or on the output side. In this embodiment, the disc spring is supported within the assembly of the slip clutch device and therefore does not need to be assembled by the customer. A customer is, for example, the fitter of an OEM [original equipment manufacturer] in the automotive sector, i.e., one of the brand manufacturers (usually known to end consumers)].

In one embodiment, the disc spring(s) are arranged between components connected to one another in a torsionally-rigid manner, for example between a flange of the input shaft hub and the (axially movable) friction disc and/or between a flange of the output shaft hub and the (axially movable) friction plate.

According to a further aspect, a drive train having an electric driving machine with a drive shaft, a transmission with a transmission input shaft and a transmission output shaft, and a slip clutch device according to an embodiment according to the above description is proposed. The drive shaft is connected to the transmission input shaft in a torque-transmitting manner by the slip clutch against electrical disruptive discharge lines and secured against an overload torque, such that a torque with a modified and/or variable transmission ratio can be transmitted to a consumer via the transmission output shaft.

The drive train is configured to transmit a torque provided by the electric driving machine and output via its drive shaft for at least one consumer in a limited manner, i.e., only up to a desired maximum setpoint value. An exemplary consumer is at least one drive wheel of a motor vehicle and/or an auxiliary unit, such as an air-conditioning pump. Conversely, it is also possible to receive inertial energy from a drive wheel, for example. The inertial energy is converted into electrical energy by the slip clutch device in a torque-limited manner in the generator mode of the electric driving machine, i.e., for example, the braking energy of a motor vehicle is recuperated, i.e., for direct electrical supply from a consumer or for electrical storage. Furthermore, in an example embodiment, a plurality of driving machines is provided. Examples are hybrid drives consisting of one or a plurality of electric driving machines and at least one internal combustion engine.

The slip clutch device proposed here transmits the torque only to a limited extent. The slip clutch device is axially so compact that a (conventionally provided) rotor bearing for the rotor of the electric driving machine can be dispensed with on the slip clutch side, such that only a single roller bearing needs to be used for the rotor shaft and the transmission input shaft on the transmission side. Such a roller bearing can also be implemented inexpensively because the slip clutch device is also a sufficient insulator against electrical disruptive discharge, such that a simple, for example (purely) metallic, roller bearing can be used on the transmission side.

According to a further aspect, a motor vehicle is proposed, including at least one drive wheel which can be driven by a drive train according to an embodiment as described above.

Nowadays, electrified motor vehicles have a large energy store, for example a lithium-based battery, such that the available installation space is small. In addition, nowadays most electrified vehicles are equipped as hybrid vehicles provided with an additional internal combustion engine, for example as a range extender, such that the installation space is further reduced. It is therefore advantageous to use a small-sized slip clutch device. The use of a slip clutch device in motorized two-wheeled vehicles, for which a similar problem applies, is similar.

The drive train described above has a small-sized slip clutch device. At the same time, production is inexpensive and an inexpensive conventional roller bearing can be used on the transmission side.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, while it should be noted that the drawings are not dimensionally accurate and are not suitable for defining proportions. In the following.

DETAILED DESCRIPTION

Figure 1:
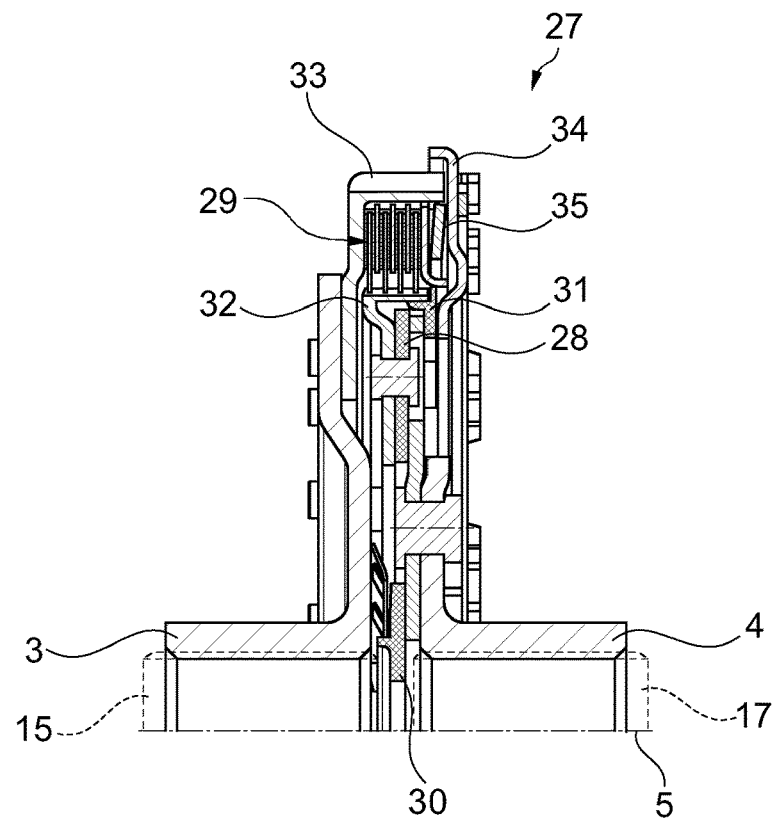
FIG. 1: shows a slip clutch device with a plate set.

FIG. 1 shows in section a conventional slip clutch device 27 as described, for example, in DE 10 2018 115 083 A1, which was published afterwards. In this respect, for a deeper understanding of this conventional feedback device 27, reference is made to the more detailed explanation provided therein. Here, a drive shaft 15 (shown in dashed lines) is connected via an input side 3, here connected by a spline, to a transmission input shaft 17 (shown in dashed lines) via an output side 4, here also connected by a spline, insulated against electrical disruptive discharge and torque-limited.

The torque about the rotation axis 5 is provided by a plate set 29 with a plurality of inner plates, which are suspended in a rotationally fixed manner in an inner plate cage 32, which in turn is connected to the output side 4 in a torsionally-rigid manner, and with a plurality of outer plates that are in an outer plate cage 33 are suspended in a rotationally fixed manner, which is in turn connected here to the input side 3 in a torsionally-rigid manner. The plates of the plate set 29 are pressed with a predetermined pressing force by a package spring 35, designed here as a disc spring. For this purpose, the package spring 35 is supported against a cover 34, and the cover 34 is fixed axially and rotationally to the outer plate cage 33.

In order to ensure the insulation, an insulation disc 28 is provided on the output side 4, via which the inner plate cage 32 is mechanically connected to the output side 4 in a torque-transmitting manner. For this purpose, in the embodiment shown, rivets are alternately provided in the circumferential direction (therefore not clearly visible here), which connect either the inner plate cage 32 and the insulation disc 28 or the insulation disc 28 and the output side 4 to one another. In this case, a torque is necessarily transmitted by the insulation disc 28 and the material of the insulation disc 28 must be selected accordingly. However, the torque is only transmitted in the circumferential direction and via shear from the insulation disc 28 to the adjacent elements (inner plate cage 32 and output side 4).

Furthermore, due to the construction shown here, a cover insulator 31 is necessary between the inner plate cage 32 and the cover 34. In addition, a shaft insulator 30 is provided between the drive shaft 15 and the transmission input shaft 17. Here, a particularly large number of standard elements are used, and this conventional slip clutch device 27 can therefore be manufactured inexpensively. In principle, the number of plates is arbitrary or, instead of a plate set, a pressing plate and a friction disc, for example with friction linings arranged on both sides, and a counterplate can be implemented. Alternatively, without a friction disc, a pressing disc can be pressed with a counterplate for frictionally engaged torque transmission.

Figure 2:
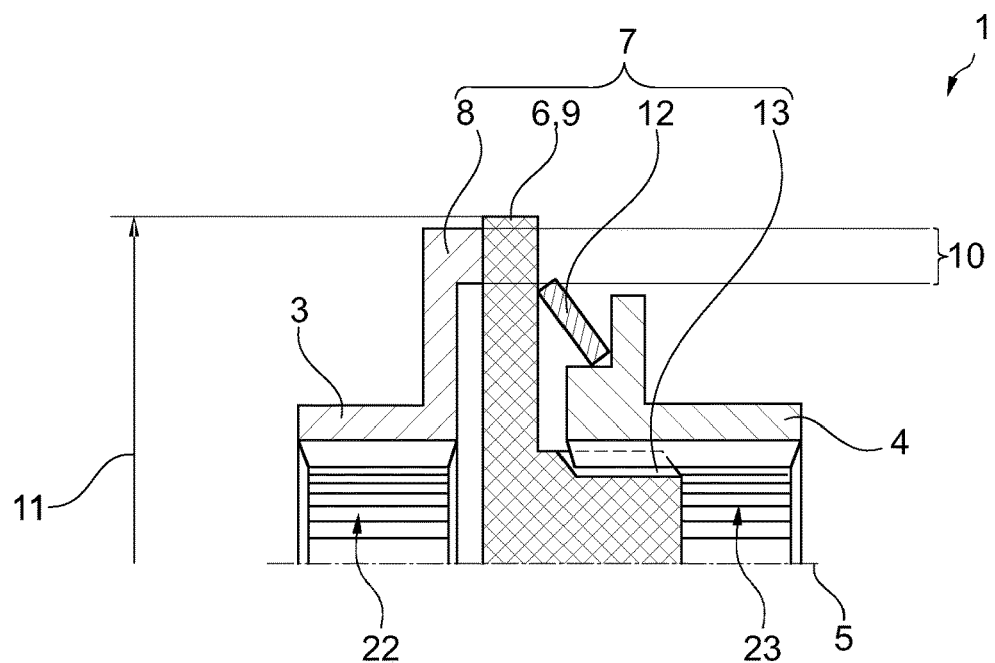
FIG. 2: shows a slip clutch device with an integrated insulation element.

In FIG. 2 a slip clutch device 1 is shown in a schematic sectional view. Here, an input side 3, which is designed as an input shaft hub with an (input-side) spline 22, and an output side 4, which is also designed with an (output-side) spline 23, are connected to each other in a torque-limited manner around a common rotation axis 5 and electrically insulated from each other. As in FIG. 1, the input side 3 and the output side 4 are basically reversible, i.e., the input side 3 can also be connected to a transmission input shaft 17 (see FIG. 1 or FIG. 4) and the output side can also be connected to a drive shaft 15 (see FIG. 1 or FIG. 4) in a torsionally-rigid manner. Further intermediate elements, such as a damper or absorber, can also be interposed.

In the illustrated embodiment of the slip clutch device 1 according to FIG. 2 and according to the (reversible) designation of the input side 3 and the output side 4, the input side 3, forms here optionally in one piece, a friction disc 8, which is brought into frictionally engaged contact with the friction plate 9 in a contact region 10 and thus form the slip clutch. The friction plate 9 is formed separately from the output side 4 and is axially displaceable relative thereto by being inserted into the output-side spline 23 of the output side 4 by optionally insulated spline 13, and thus connected to the output side 4 in a torsionally-rigid manner. In this embodiment, the friction plate 9 forms the insulation element 6 by, in this optional embodiment, the entire friction plate 9 being made of an insulating material, for example ceramic.

A torque is transmitted in a frictionally engaged manner to the friction plate 9 via the contact region 10 with the friction disc 8 and this torque is directed in the radial direction towards the spline 13, such that the insulation element 6 is designed as a bearing structure. The insulation region 11 expands both radially outwards and radially inwards (here up to the rotation axis 5 or over the entire radial extent), and here also (optionally) the entire axial extent beyond the contact region 10. In this embodiment, a shaft insulator 30, as required in the embodiment according to FIG. 1, can thus be dispensed with. A cover insulator 31, as shown in the embodiment according to FIG. 1, is also omitted.

For a defined pressing force, a disc spring 12 is provided, which acts between the output side 4 (by a flange) and the friction plate 9 on the slip clutch 7 in such a way that a torque can be transmitted in a frictionally engaged manner and is limited to a maximum setpoint between the input side 3 and the output side 4. It should be pointed out again that, even if the input side 3 connected to an electric driving machine 2 or its drive shaft 15 (see FIG. 4) and the output side is connected to a transmission input shaft 17 of a transmission 16 (see FIG. 4), a torque can also be transmitted in the opposite direction from the output side 4 to the input side 3, for example for the recuperation of braking energy.

Figure 3:
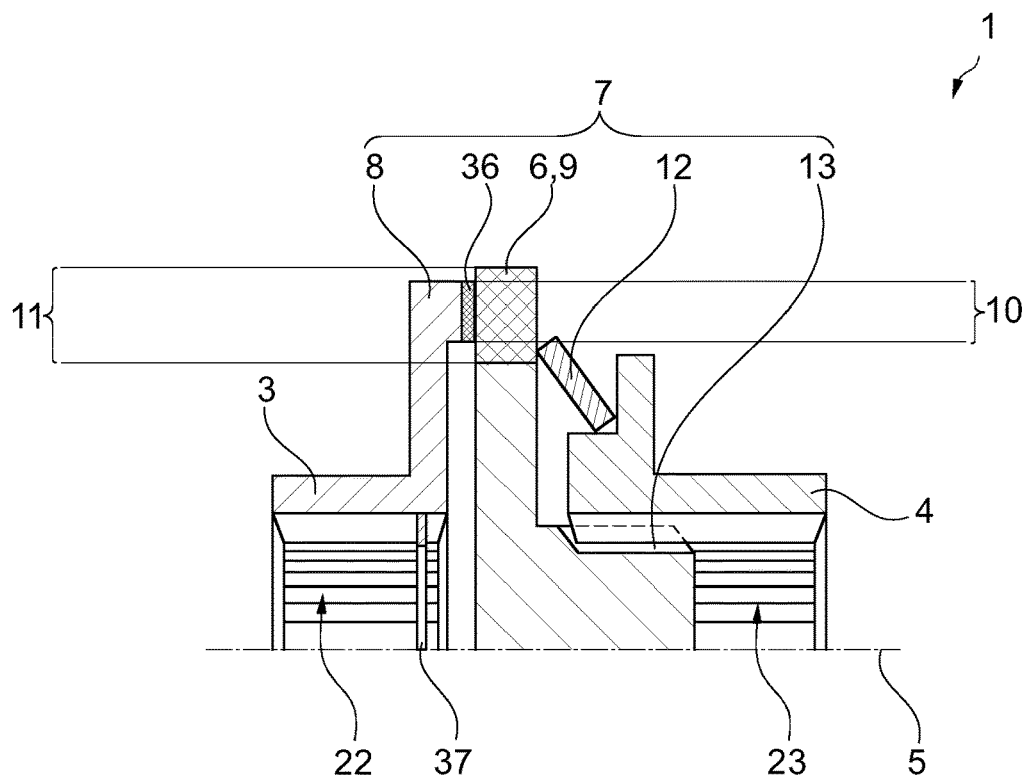
FIG. 3: shows a slip clutch device with an integrated insulation element in a further embodiment.

For the sake of clarity, in FIG. 3 an almost identical embodiment of the slip clutch device 1 as shown in FIG. 2 is illustrated, wherein reference is made in this respect to the description of FIG. 2. In contrast to the embodiment according to FIG. 2, a separate friction lining 36 is provided here in FIG. 3 on the friction disc 8, and a friction lining can additionally or alternatively be provided on the friction plate 9 accordingly. Whether a friction lining 36 is provided or not depends on the installation space, the desired pressing force and the achievable size of the contact region 10, in that a friction pairing with a high coefficient of friction can be set without the material of the friction lining needing to form a bearing structure for a radial transmission of a torque. Alternatively or (correspondingly) additionally, a surface structure, for example roughening or corrugation, is provided to increase a coefficient of friction in the friction disc and/or in the friction plate.

Regardless of the provision of a friction lining 36, the insulation region 11 in this illustration is made smaller than in the embodiment according to FIG. 2, such that a highly electrically conductive material, for example steel, can be used radially within the insulation region 11. The material of the insulation region 11 is connected to the rest of the friction plate 9 in a form-fitting, force-fitting and/or material-fitting manner. Here, too, a torque transmitted in a frictionally engaged manner via the contact region 10 is transmitted within the insulation region 11 in the radial direction towards the spline 13 of the friction plate 9.

In an example embodiment, a securing ring 37 is also provided, which is formed from conventional (highly electrically conductive) material or an insulation material that prevents an inserted shaft, for example the drive shaft 15 (see FIG. 1 or FIG. 4) from being brought too close to the electrically conductive region of the friction plate 9, or from coming too close to the friction plate 9 due to thermal expansion during operation. In an alternative embodiment, only one region (here on the output side) towards the connection to the output side 4 or the input side 3 is formed from a highly electrically conductive material, for example only the spline 13.

In one embodiment, the friction disc 8 is axially movable and/or the friction plate 9 is axially fixed.

Figure 4:
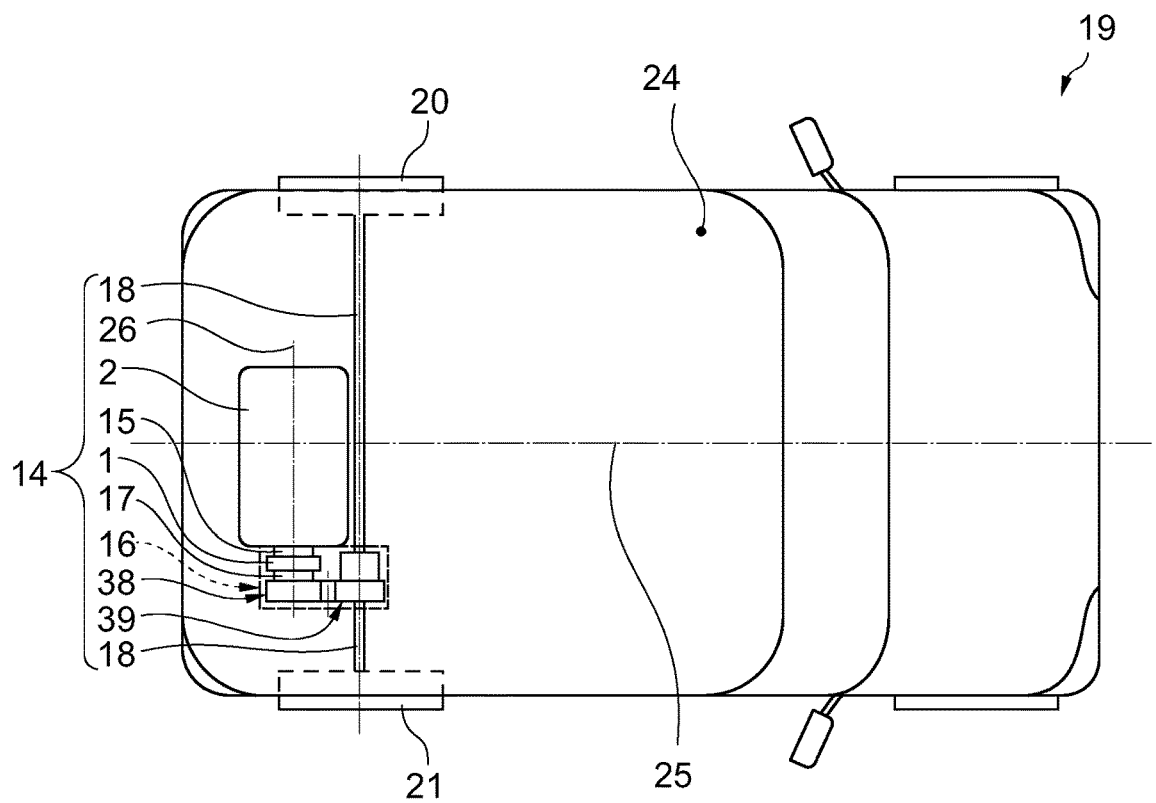
FIG. 4: shows a drive train in a motor vehicle with a slip clutch device.

In FIG. 4, a drive train 14, including an electric driving machine 2 with a drive shaft 15, a slip clutch device 1, and a transmission 16 connected in a torque-limited manner in a motor vehicle 19, is shown schematically. The drive train 14 is configured here to drive a left drive wheel 20 and a right drive wheel 21, which thus form a consumer here. The drive train 14 is arranged here in the motor vehicle 19 in the rear relative to the longitudinal axis 25 and the driver's cab 24 arranged at the front. The electric driving machine 2 is arranged here axially parallel to the (two-part) transmission output shaft 18 and here also aligned with the motor axis 26 transversely to the longitudinal axis 25.

The drive shaft 15 is connected to the transmission input shaft 17 in a torque-limited manner by the slip clutch device 1, and the electric driving machine 2 is thus also electrically insulated from the components of the transmission 16 or the drive train 14 connected downstream of the slip clutch device 1, namely against a disruptive discharge voltage due to the built-up capacitances. The transmission 16 is shown here purely schematically with a (speed) reduction gear 38 and a (for example bevel gear) differential 39. A left drive wheel 20 and a right drive wheel 21 can thus be driven by the electric driving machine 2 in a (for example, fixed) reduction ratio according to the torque requirement, such that the motor vehicle 19 can be moved in one direction (at least infinitesimally when cornering) along the longitudinal axis 25.

The slip clutch device proposed here has a cost-effective construction having low installation space requirements and integrated disruptive discharge insulation.

REFERENCE NUMERALS

1 Slip clutch device
2 Electric driving machine
3 Input side
4 Output side
5 Rotation axis
6 Insulation element
7 Slip clutch
8 Friction disc
9 Friction plate
10 Contact region
11 Insulation region
12 Disc spring
13 Spline of the friction plate
14 Drive train
15 Drive shaft
16 Transmission 17 Transmission input shaft
18 Transmission output shaft
19 Motor vehicle
20 Left drive wheel
21 Right drive wheel
22 Input-side spline
23 Output-side spline
24 Driver's cab
25 Longitudinal axis
26 Motor axis
27 Conventional slip clutch device
28 Insulation disc
29 Plate set
30 Shaft insulator
31 Cover insulator
32 Inner plate cage
33 Outer plate cage
34 Cover
35 Package spring
36 Friction lining
37 Securing ring
38 Reduction gear
39 Differential

The invention claimed is:

1. A slip clutch device for an electric driving machine, comprising:
 a rotation axis;
 a first side rotatable about the rotation axis, the first side comprising a first spline for receiving a first shaft;
 a second side rotatable about the rotation axis, the second side axially offset from the first side and comprising a second spline arranged for receiving a second shaft;
 a slip clutch connecting the first side to the second side in a torque-limiting manner, the slip clutch comprising:
  a friction disc; and
  a friction plate disposed axially between the first side and the second side, and pressed against the friction disc in a contact region in a frictionally engaged torque-transmitting manner, wherein:
   the friction disc or the friction plate comprises an electrically insulating material in an insulation region extending radially over the contact region to form an electrical insulation element for preventing an electrical disruptive discharge line between the first side and the second side.

2. The slip clutch device of claim 1, wherein an entirety of the friction plate is formed from the electrically insulating material.

3. The slip clutch device of claim 1, further comprising an axially acting disc spring for pressing the friction plate against the friction disc.

4. The slip clutch device of claim 1, wherein:
 the friction plate is axially movably connected to the second side in a torsionally-rigid manner by a form-fitting connection.

5. The slip clutch device of claim 4 wherein the form-fitting connection is a spline.

6. The slip clutch device of claim 4, further comprising an axially acting disc spring for pressing the friction plate against the friction disc, wherein the axially acting disc spring is axially supported on the second side and disposed radially outside of and at least partially aligned with the form-fitting connection.

7. The slip clutch device of claim 1, wherein:
 the friction disc is formed in one piece with the first side as a shaft hub.

8. A drive train comprising:
 an electric driving machine with a drive shaft;
 a transmission with a transmission input shaft and a transmission output shaft; and
 the slip clutch device of claim 1 connecting the drive shaft to the transmission input shaft:
  in a torque-transmitting manner up to an overload torque; and
  against electrical disruptive discharge lines.

9. A motor vehicle comprising:
the drive train of claim 8; and
at least one drive wheel driveable by the drive train.

* * * * *